United States Patent [19]
Recker

[11] 3,990,550
[45] Nov. 9, 1976

[54] SHAFT COUPLING
[76] Inventor: Florian B. Recker, 802 First St. SE., Dyersville, Iowa 52040
[22] Filed: July 10, 1975
[21] Appl. No.: 594,783

[52] U.S. Cl. ................................. 192/46; 403/325; 403/359
[51] Int. Cl.² .................. F16D 41/18; F16D 1/00; F16B 21/02
[58] Field of Search .............. 192/46; 403/322, 325, 403/259

[56] References Cited
UNITED STATES PATENTS
| | | | |
|---|---|---|---|
| 677,592 | 7/1901 | Patrick | 192/46 |
| 2,340,368 | 2/1944 | Dodge | 192/46 X |
| 2,886,358 | 5/1959 | Munchbach | 403/359 |
| 3,718,213 | 2/1973 | Hegar et al. | 403/359 X |

FOREIGN PATENTS OR APPLICATIONS
| | | | |
|---|---|---|---|
| 1,102,886 | 5/1955 | France | 403/322 |

*Primary Examiner*—Allan D. Herrmann
*Attorney, Agent, or Firm*—Henderson, Strom & Sturm

[57] ABSTRACT

An overrunning clutch for transmitting rotary power in one direction and preventing the transmission of rotary power in an opposite direction. A shaft coupling being disposed for rotary movement within the overrunning clutch to provide a locking mechanism for connecting or disconnecting a shaft to the overrunning clutch.

11 Claims, 9 Drawing Figures

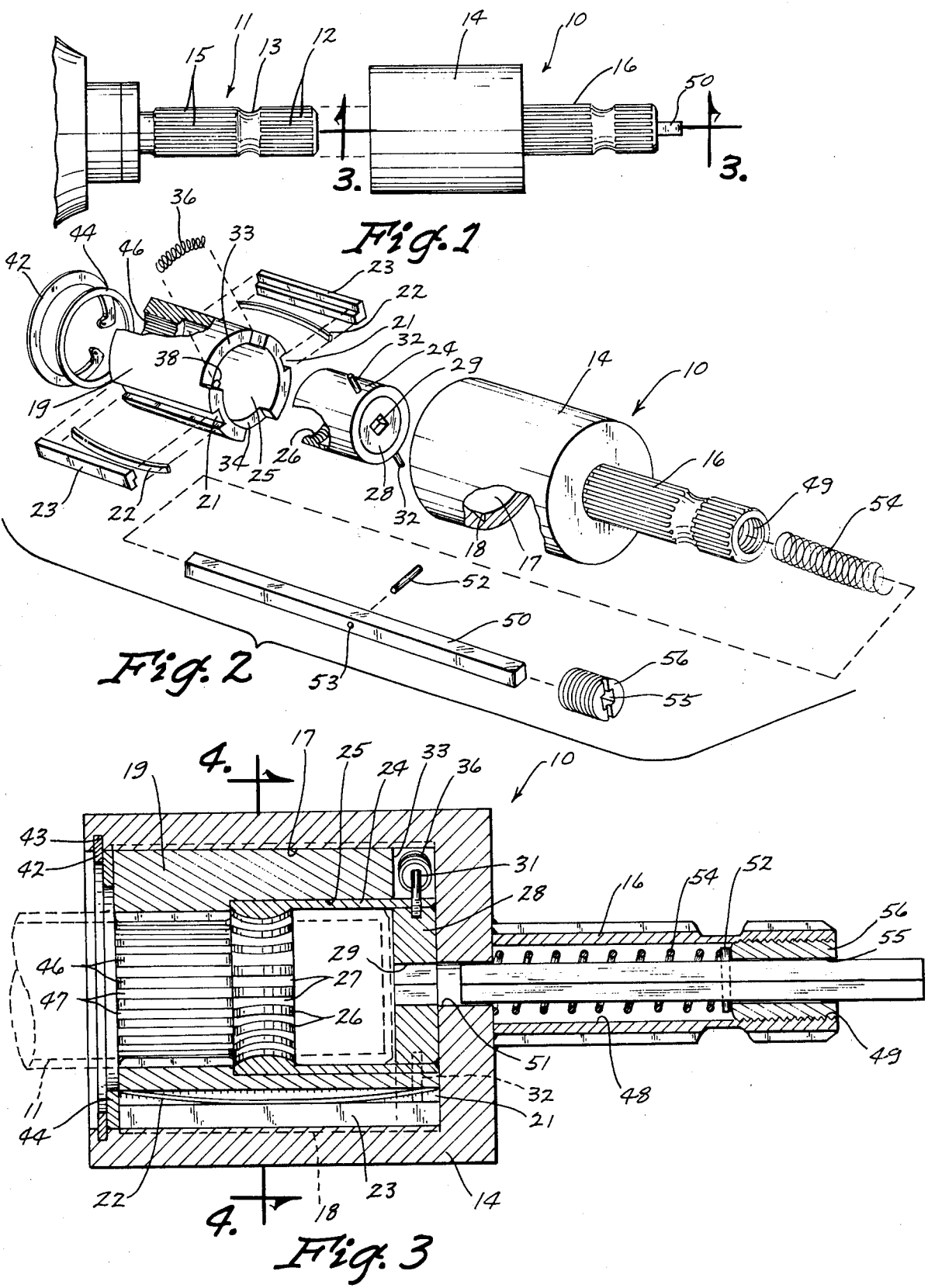

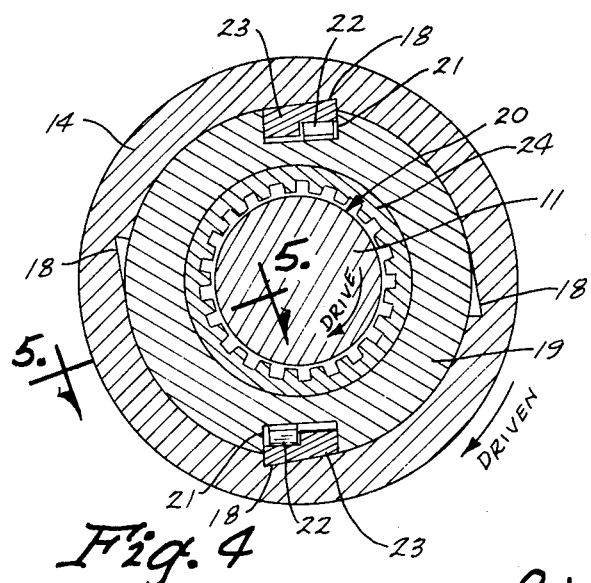
Fig. 4
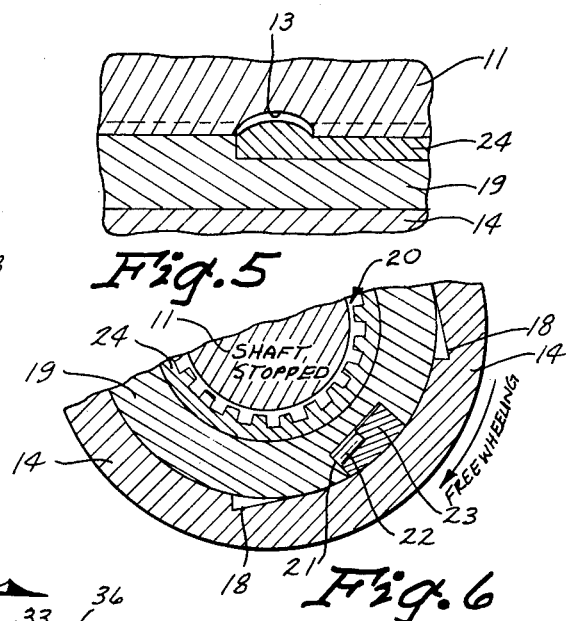
Fig. 5
Fig. 6
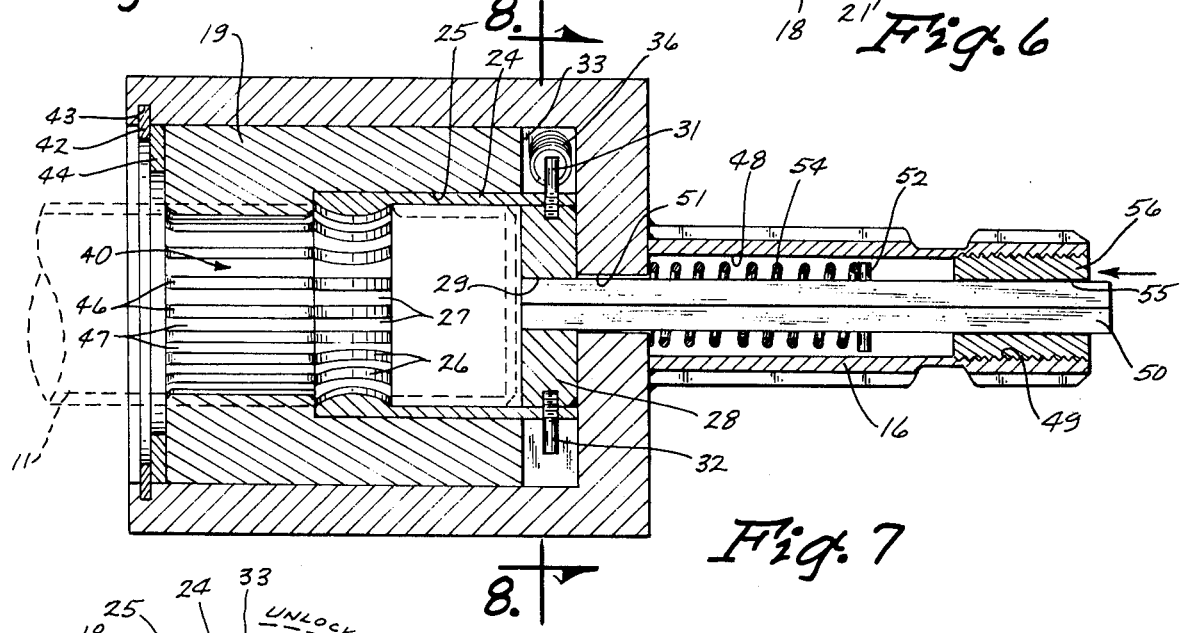
Fig. 7
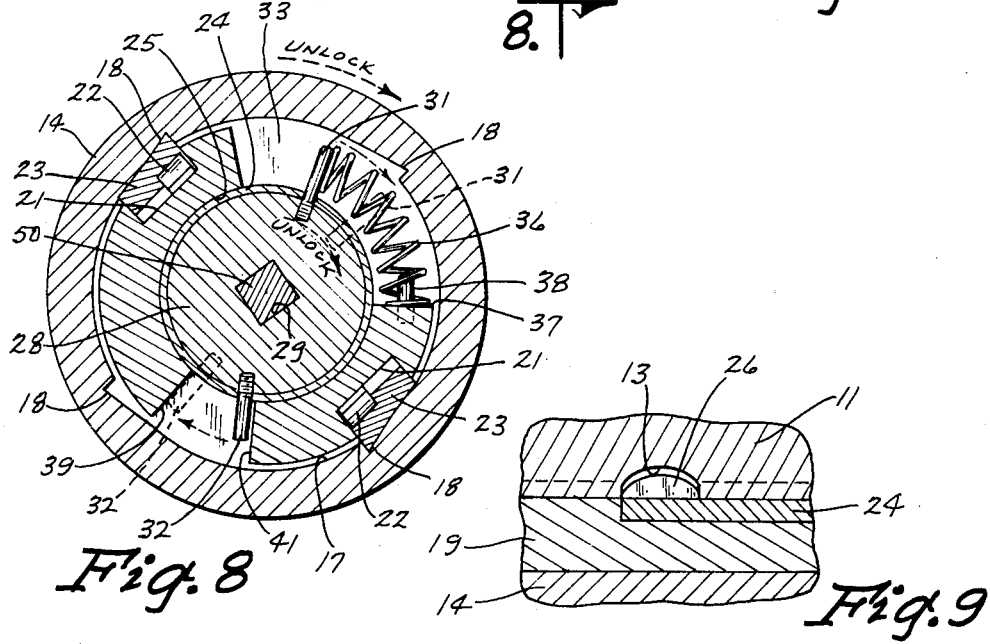
Fig. 8
Fig. 9

SHAFT COUPLING

BACKGROUND OF THE INVENTION

The present invention relates generally to a shaft coupling and more particularly to a shaft coupling within an overrunning clutch apparatus which transmits rotary power in only one direction.

The problem of how to couple one shaft to another for transmitting a torque force is a longstanding one. This has particularly been true in the farming community because the power take-off of an agricultural tractor frequently needs to be connected and disconnected to utilize one implement and then another. This problem has been solved in the past in one degree or another, and one of the most commercially successful of these solutions is a connection of the type disclosed in U.S. Pat. No. 3,448,278, which was patented in 1948.

In U.S. Pat. No. 2,448,278, a pin is spring biased to one position within a coupling housing such that it will contact and hold one spline of a power take-off to thereby hold the coupling together. In another position of the pin, it is moved so that it does not block or contact any of the splines and thereby allows the housing to be removed from the power take-off shaft. Since 1948 when the above mentioned patented coupler was developed, the horsepower rating of typical agricultural tractors has continued to increase. Because of the very high torque which can be developed from the power take-offs of modern-day agricultural tractors, it is desirable that the coupling be held at more than one point and on more than one spline of the power take-off shaft. A French Pat. No. 1,102,886 patented in France in 1955, discloses a design for locking on all of the splines of a power take-off shaft, but this design has not become a commercial success, at least not in this country, presumably because of its somewhat complicated structure utilized to position and bias the locking splines.

While it has long been the standard procedure to directly couple a farm implement to a farm tractor through a solid coupling as discussed above, it has been found that there are many instances when it is desirable to interpose what is commonly called an overrunning clutch in the transmission line between the power take-off of the tractor and the implement being utilized. This is particularly true for machines which produce a high degree of inertial forces such as the rotary mowers or choppers which are in common usage. When the blades of such machines are rotated at high speeds, they have a considerable amount of inertia or momentum which causes them to continue rotation even when the tractor is stopped. Such continuation of the rotation of the cutting blades will then often be transmitted by the drive shaft to the power take-off of the tractor, causing the tractor to move ahead along the ground beyond the point where it was intended to be stopped. This may be true even when the clutch pedal of the tractor is depressed. This is particularly a problem for tractors which do not have the feature commonly called live power. Accordingly, power take-off connections of the type commonly referred to as an overrunning clutch have been developed. An example of such a connection is disclosed in U.S. Pat. No. 3,233,471.

U.S. Pat. No. 3,233,471 discloses an overrunning clutch having a pin which is received through an inner member and through the power take-off shaft of a tractor in order to maintain a positive connection between these two members. It is very important that a positive connection be formed.

While the coupling of U.S. Pat. No. 3,233,471 is very dependable, it is more time consuming to connect than the standard disconnect couplings such as disclosed in U.S. Pat. No. 2,448,278, which does not have the overrunning clutch connection as a part thereof. Accordingly, there is a genuine need to have an overrunning clutch coupler which is of a quickly detachable variety. Additionally, there are some power take-off shafts which do not have a hole passing therethrough, and consequently, the power take-off connection disclosed in U.S. Pat. No. 3,233,471 would not be suitable for use under such conditions.

The power take-off shafts of tractors normally have longitudinal splines and grooves around the periphery thereof. The standard number of splines on older tractors is six, while the standard number of splines on newer tractors is usually twenty-one. Since it is clear that if the same size of shaft has a larger number of splines thereon, that these splines will be smaller and each spline will have less strength. This is particularly important when considering the use of the coupling as disclosed in U.S. Pat. No. 2,448,278, since this type of coupling engages only one or possibly two of the splines, the smaller splines could possibly be subject to unbearable forces in use with the high horsepower tractors of today. Accordingly, it is readily apparent why it is desirable to be able to hold a power take-off shaft on each of its splines, rather than on only one or two.

SUMMARY OF THE INVENTION

The present invention relates to a housing which is adapted to be connected to a shaft. An inner member is rotatably disposed within the housing and this inner member has a non-circular opening therein. A mechanism is provided between the housing and the inner member for allowing rotation of the housing with respect to the inner member in one rotary direction thereof, and preventing rotation of the housing with respect to the other member in an opposite direction. A non-circular shaft from the power take-off of a tractor, for example, is adapted to be slidably received in the non-circular opening in the inner member, for transferring rotary power from the shaft to the inner member. A mechanism is also provided for selectively locking the non-circular shaft within the inner member against longitudinal movement with respect to the inner member.

An object of the present invention is to provide a quickly detachable overrunning clutch device.

Another object of the invention is to provide a device for providing positive locking on all of the splines of a power take-off shaft within an overrunning clutch device.

Still another object of the invention is to provide an overrunning clutch device adaptable for use with a power take-off shaft which does not have a hole passing therethrough.

Other objects, advantages, novel features of the present invention will become apparent from the following detailed description of the invention when considered in conjunction with the accompanying drawings.

BRIEF DESCRIPTION OF THE DRAWINGS

FIG. 1 is a plan view of the present invention in readiness to be connected to the power take-off of a tractor;

3

FIG. 2 is an exploded view of the present invention;

FIG. 3 is a cross-sectional view of the present invention taken along line 3—3 of FIG. 1;

FIG. 4 is a cross-sectional view taken along line 4—4 of FIG. 3;

FIG. 5 shows a partial cross-sectional view taken along line 5—5 of FIG. 4 and showing the shaft in a locked position;

FIG. 6 is a partial cross-sectional view, like FIG. 4, but showing the shaft in a stopped position and the housing in a free-wheeling position;

FIG. 7 is a cross-sectional view, like FIG. 3, but showing the shaft locking mechanism in action;

FIG. 8 is a cross-sectional view taken along line 8—8 of FIG. 7; and

FIG. 9 is a partial cross-sectional view like FIG. 5 but showing the shaft in an unlocked position.

DESCRIPTION OF THE PREFERRED EMBODIMENT

Referring now to the drawings wherein like reference numerals designate identical or corresponding parts throughout the several views.

FIG. 1 shows the present invention 10 in readiness to be connected to a power take-off shaft 11 of a tractor. The power take-off of the tractor is comprised generally of a shaft having a plurality of splines 12 and 15 longitudinally disposed thereon. An annular depression 13 is located on the power take-off shaft 11 so as to divide the splines 12 from the splines 15.

The present invention 10 has a main housing 14 which is rigidly attached to an extension shaft 16. This shaft 16 is of the general configuration of the power take-off shaft 11. The shaft 16 is adapted to be connected to the drive linkage of an implement, as will be discussed below. The main housing 14 has an inner opening 17, having a series of longitudinal grooves 18 disposed therein. Rotatably disposed within the housing 14 is disposed an inner member 19.

The inner member 19 has a pair of longitudinal grooves 21 on opposite sides thereof for reception of an arcuately-shaped flat spring steel biasing member 22. This spring 22 is disposed underneath a dog member 23 which also is received within the groove 21. It can be clearly seen in FIG. 4 that when the power take-off shaft 11 is rotating in a clockwise direction the outer housing will be driven also in a clockwise direction because the dog members 23 engage the radial walls of the slots 18. When the power take-off shaft 11 is stopped (FIG. 6), then the housing 14 is free to continue to rotate in a clockwise direction because of the configuration of the grooves 18 and the configuration of the dogs 23, so that this free-wheeling motion of the housing 14 is not transmitted to the power take-off shaft 11.

An annular locking member 24 is received within an opening 25 in the inner member 19. This annular member 24 has a series of splines 26 and grooves 27 disposed along the inner periphery of one end thereof to form a non-circular shaped opening 20 (FIGS. 4 and 6). The other end of the annular member 24 has a plate 28 having a square bore 29 in the center thereof. A first projection 31 is threadedly engaged into the plate 28 and a second projection 32 is threadedly engaging the plate 28, through the annular member 24, on the opposite side thereof. The first projection 31 is received within a first radial slot 33 of inner member 19, and the second projection 32 is received within a second radial slot 34 in the inner member 19.

A compression spring 36 is attached, or is in abutment at one end thereof with the first projection 31 and the other end of the compression spring 36 is in abutment with an end 37 of the first radial slot 33. A peg 38 is received in the wall 37 of the slot 33 to keep the compression spring 36 aligned. The second radial slot 34 has end walls 39 and 41. These end walls 39 and 41 form stops in cooperation with the second projection 32 as will be discussed below.

The inner member 19 is held within the housing 14 by a snap ring 42 which is received within an annular groove 43 in the housing 14. An annular ring 44 is interposed between the inner member 19 and the snap ring 42 to decrease the amount of friction between these two members.

One end of the inner member 19 has a series of splines 46 and grooves 47 around the inner periphery thereof to form a non-circular shaped aperture 40 (FIG. 7). The number and spacing of the splines and grooves 46 and 47 on the inner periphery of the inner member 19 correspond generally to the spacing and configuration of the splines and grooves 27 on the inner periphery of one end of the annular member 24.

The splined extension shaft 16 is rigidly connected to the housing 14 such as by welding. This structure 16 has a hole 48 through the center thereof, and this hole 48 has threads 49 on one end thereof. A square rod 50 is disposed in the hole 48, and this square rod 50 is also adapted to be received through a hole 51 in the housing 14, and further into the square bore 29 in the plate 28. A peg 52 is snuggly received through the rod 50 so that it will not be easily dislodged from the hole 53 in rod 50. A compression spring 54 is received within the hole 48 of the extension member 16. This compression spring 54 abuts the peg 52 on one end thereof and abuts the housing 14 on the other end thereof so as to bias the rod 50 to the position as shown in FIG. 3, whereby the peg 52 is held in abutment with the member 56 which is threadedly engaged with the threads 49 on the inside of the extension 16.

In operation, the coupling device 10 of the present invention would be slid longitudinally onto the shaft 11 such that the splines 12 of the power take-off shaft 11 would mate with the grooves 47 on the inner member 19. Once this has been done, then the rod 50 is manually moved from the position shown in FIG. 3 to the left-most position as shown in FIG. 7, whereby the square rod 50 is received within the opening 29 in the plate member 28. At such time the annular member 24 is held fixed with respect to the housing 14. The main housing 14 and thereby the annular member 24 are rotated in a counterclockwise direction with respect to the inner member 19 and the shaft 11, as shown in FIGS. 6 and 8 such that the spring 36 is compressed and so that the splines 46 on the inner member 19 are aligned with the splines 26 on the annular member 24, as shown clearly in FIG. 7. Because the splines and grooves of the inner member 19 and those of the annular member 24 are aligned as shown in FIG. 7, the overrunning clutch coupling 10 may then be slid completely on to the power take-off shaft 11 such that the splines 15 on the other side of the groove 13 of the power take-off shaft 11 will engage the spline and groove structure 46 and 47 on the inner member 19. The rod 50 is then released and allowed to move back to the position shown in FIG. 3 because of the force of the spring 54. The compression spring 36 will then rotate the annular member 24 with respect to the inner member 19 so that the splines 26 of the inner member 24 are aligned with the grooves 47 of the inner member 19 and the splines 26 of the annular member 24 are misaligned with the splines 46 of the inner member 19.

When the present invention 10 is so installed and locked on the power take-off shaft 11, then the tractor is backed up to an implement and the power linkage of the implement (not shown) is coupled to the extension mechanism 16 in any convenient manner such as shown in U.S. Pat. No. 2,448,278 or preferably as shown in co-pending Ser. Nos. 558,136 and 558,138. The implement may then be utilized with the safety of an overrunning clutch within the drive linkage. Other implements may also be utilized at different times by merely disconnecting the implement from the extension mechanism 16 of the present invention 10 as it would be connected or disconnected from an ordinary power take-off shaft. It will be understood that the present invention 10 can be left on the power take-off shaft 11 or it may be conveniently removed by first pushing in the rod 50 (FIG. 7). Once the rod 50 is received within the hole 29, then the housing 14 is rotated in a clockwise fashion as shown in FIG. 8. This action compresses the spring 36 and rotates the annular member 24 from the locked position as shown in solid lines (FIG. 8) to the unlocked position as shown in dotted lines representing the first and second projections 31 and 32 respectively. When the rod 50 is received in the bore 29 then the annular member 24 is moved with the outer housing 14 because of the squareness of the bore 29 in the plate 28, the square bore 55 in the member 56 and the squareness of the rod 50 itself. Since the splines and grooves of the inner member 19 and the annular member 24 are aligned (FIG. 7) the invention 10 can be slid off of the shaft 11.

Accordingly, the present invention does indeed accomplish the objects mentioned above. Obviously, many modifications and variations of the present invention are possible in light of the above teachings. It is therefore to be understood that, within the scope of the appended claims, the invention may be practiced otherwise than as specifically described.

I claim:
1. An overrunning clutch comprising:
a housing having an opening therein;
an inner member rotatably disposed within said opening in the housing, said inner member having an aperture therein, said aperture being non-circular and being substantially identical in shape along the longitudinal length thereof so that it is adapted to selectively and slidably receive a complimentarily shaped shaft longitudinally within said aperture;
means for preventing relative rotary movement of the housing with respect to the inner member in one rotary direction and allowing rotary movement of the housing with respect to the inner member in an opposite rotary direction;
means rotatably received within said housing for selectively locking a complimentarily shaped shaft when received in said aperture against longitudinal movement with respect to said inner member; and
means attached to said housing to selectively engage said locking means for selectively rotating said locking means with respect to said inner member.

2. An overrunning clutch as defined in claim 1 wherein said locking means comprises an annular member having an inner opening of a non-circular shape similar to the shape of the aperture in the inner member, and whereby said inner opening of said annular member has a first rotary position wherein the inner opening and the aperture are substantially congruently aligned and a second rotary position wherein the inner opening and the aperture are misaligned to thereby lock a shaft against longitudinal movement with respect ot said inner member.

3. An overrunning clutch as defined in claim 2 wherein said shaft receivable in said inner member has an annular depression therein for allowing rotation of said annular member of the locking means.

4. An overrunning clutch as defined in claim 2 wherein said annular member of said locking means is rotatable within said inner member.

5. An overrunning clutch as defined in claim 4 wherein said annular member is biased to said second rotary position.

6. An overrunning clutch as defined in claim 5 wherein said housing has a second opening therein and said means for rotating the annular member of said locking means with respect to said inner member is receivable through said second opening in the housing.

7. An overrunning clutch as defined in claim 6 wherein said means for rotating the annular member of said locking means comprises a rod having a non-circular end thereon;
a plate being rigidly connected to said annular member and having a bore therein of the same general cross-sectional shape as said non-circular end of said rod, whereby rotation of said rod when received in said bore of said plate is operative to rotate said annular member.

8. An overrunning clutch as defined in claim 7 wherein said rod is biased to a position wherein the non-circular end thereof is withdrawn from said bore.

9. An overrunning clutch as defined in claim 8 wherein said housing has an extension adapted to be connected to a shaft coupling, a hole being disposed longitudinally in said extension and said rod being slidably received in said hole.

10. An overrunning clutch as defined in claim 9 wherein a spring is disposed in said hole and comprises the means for biasing the rod to the withdrawn position.

11. An overrunning clutch as defined in claim 10 wherein said annular member has a first and a second projection extending radially therefrom;
said inner member having a first and a second radial slot therein respectively receiving said first and second projections;
a spring operatively connected to said first projection on one end thereof and operatively connected to said inner member within said first slot, said second slot having end walls comprising stop means in conjunction with said second projection to thereby limit the rotary action of the annular member with respect to said inner member.

* * * * *